United States Patent [19]

Brzostek et al.

[11] Patent Number: 4,494,815
[45] Date of Patent: Jan. 22, 1985

[54] SELF-ALIGNING COVER FOR MODULAR TRICOUPLER

[75] Inventors: Melvin W. Brzostek, Bel Air; Edwin C. Hardesty, Perry Hall; Erle M. Hutchins, Bel Air, all of Md.

[73] Assignee: AT&T Technologies, Inc., New York, N.Y.

[21] Appl. No.: 442,930

[22] Filed: Nov. 19, 1982

[51] Int. Cl.$^3$ .............................................. H01R 13/60
[52] U.S. Cl. ................................. 339/123; 339/126 R; 339/156 R; 339/176 M; 339/198 J; 174/66
[58] Field of Search ............... 339/122 R, 123, 125 R, 339/126 R, 134, 154 R, 154 A, 156 R, 157 R, 176 M, 198 J, 204, 205; 174/66; 179/178

[56] References Cited

U.S. PATENT DOCUMENTS

| | | | |
|---|---|---|---|
| 2,934,590 | 4/1960 | Thompson et al. | 339/122 R X |
| 3,011,008 | 11/1961 | Slater | 339/123 X |
| 3,849,608 | 11/1974 | Bustos et al. | 179/178 X |
| 3,859,454 | 1/1975 | Mann | 174/66 |
| 3,982,809 | 9/1976 | Ward et al. | 339/198 J X |
| 4,071,696 | 1/1978 | Anderson | 339/154 A |
| 4,088,384 | 9/1980 | Gumb | 339/156 R |
| 4,273,957 | 6/1981 | Kolling, Jr. | 179/1 PC |
| 4,290,664 | 9/1981 | Davis et al. | 339/156 R |

FOREIGN PATENT DOCUMENTS 271745 12/1966 Australia ...................... 339/126 R

OTHER PUBLICATIONS

W. A. Dix, "Surface Mounted Connecting Block", Western Electric Technical Digest, No. 63 (Jul., 1981), pp. 15, 16.

Primary Examiner—John McQuade
Assistant Examiner—Steven C. Bishop
Attorney, Agent, or Firm—E. W. Somers

[57] ABSTRACT

A wall outlet (20), which facilitates the interconnection of lengths of inside wiring to a network interface device, includes provisions for receiving a modular plug (31) which terminates a cord (32) that is connected to customer station equipment. The wall outlet includes a tricoupler (30) and a cover (25). The tricoupler includes a housing (80) having first and second generally opposed plug-receiving cavities (82, 83) and a third cavity (87). A plurality of metallic wire-like contact elements (90-90) are disposed in the housing of the tricoupler and are engaged by blade-like terminals (60-60) of modular plugs which are inserted into the cavities. The cover includes latching tabs (164-164) which are adapted to be received in grooves (163-163) of the tricoupler housing to secure the tricoupler to the cover. The cover is provided with alignment facilities for causing an opening (162) in the cover to become aligned with the third cavity and the latching tabs with the housing grooves as the tricoupler is secured to the cover.

10 Claims, 13 Drawing Figures

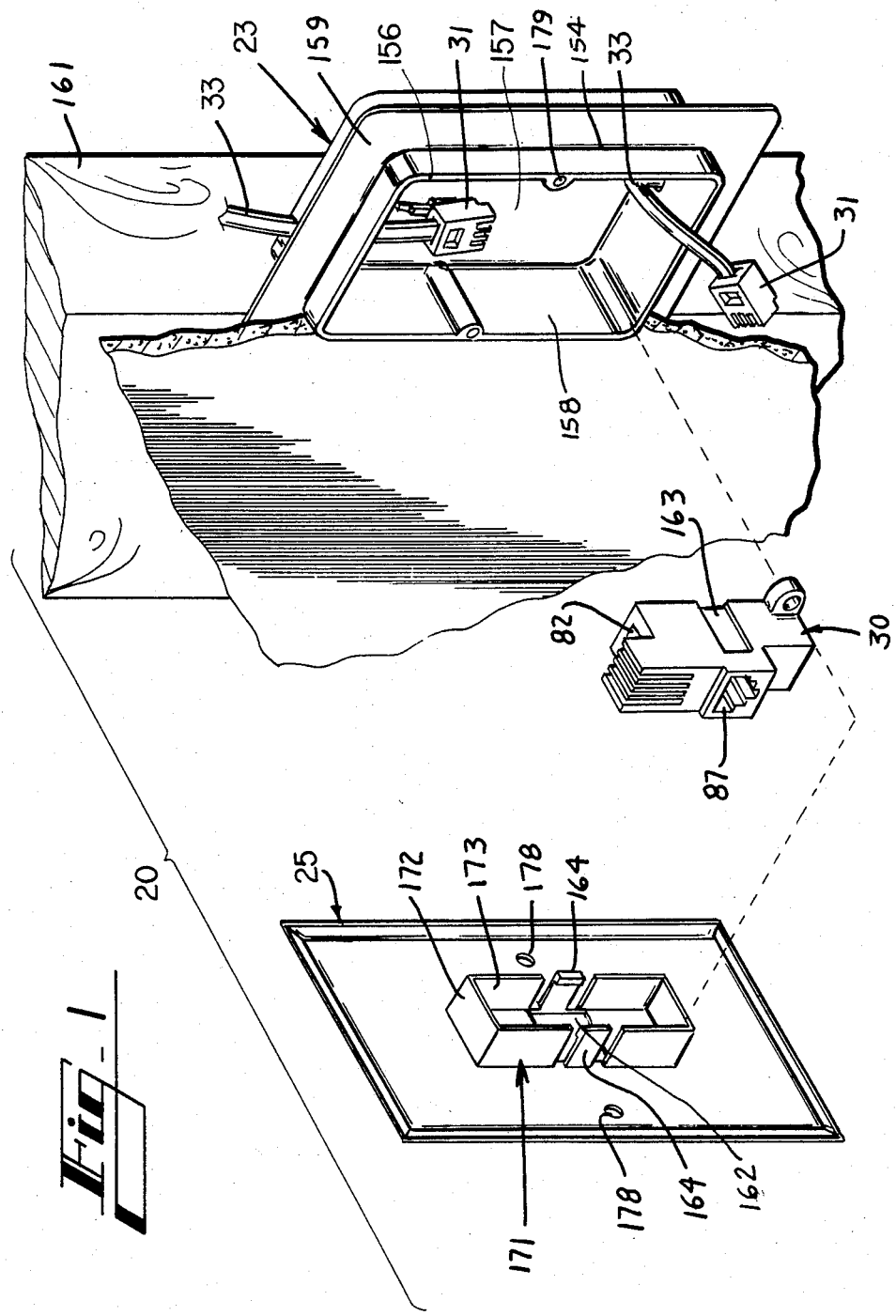

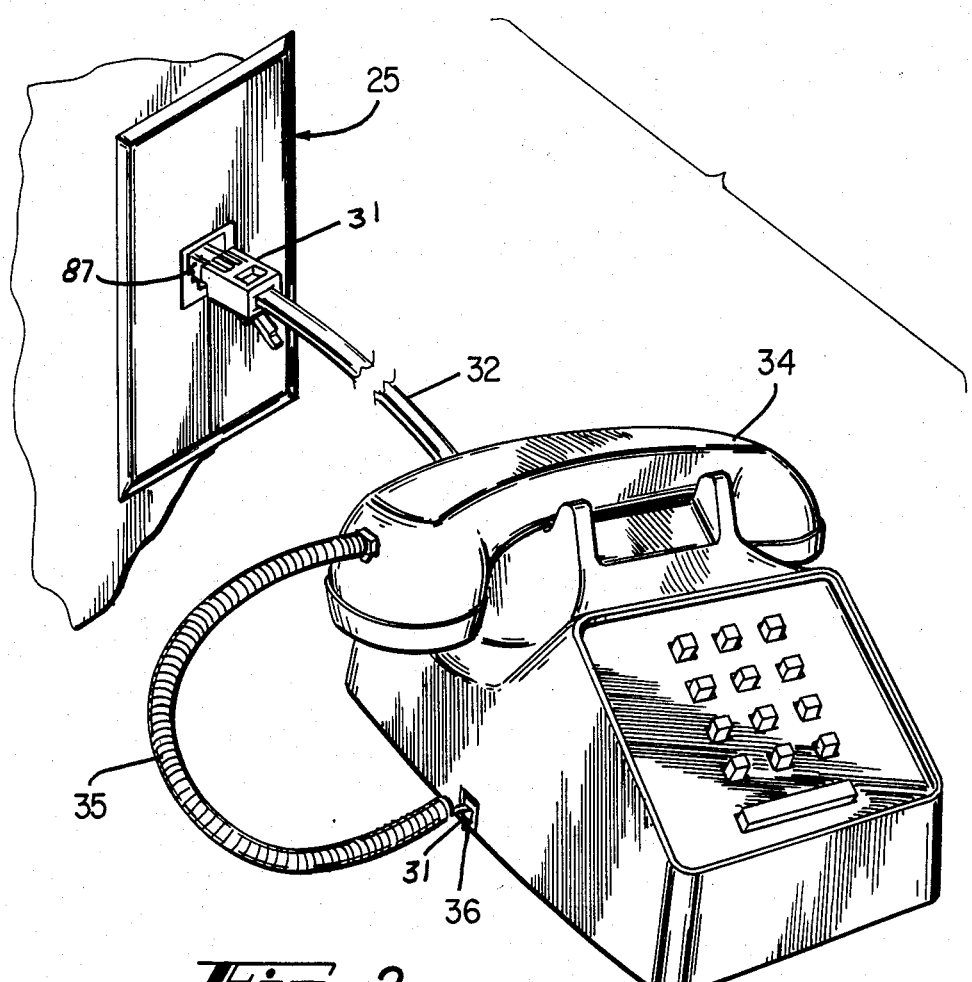
Fig_2
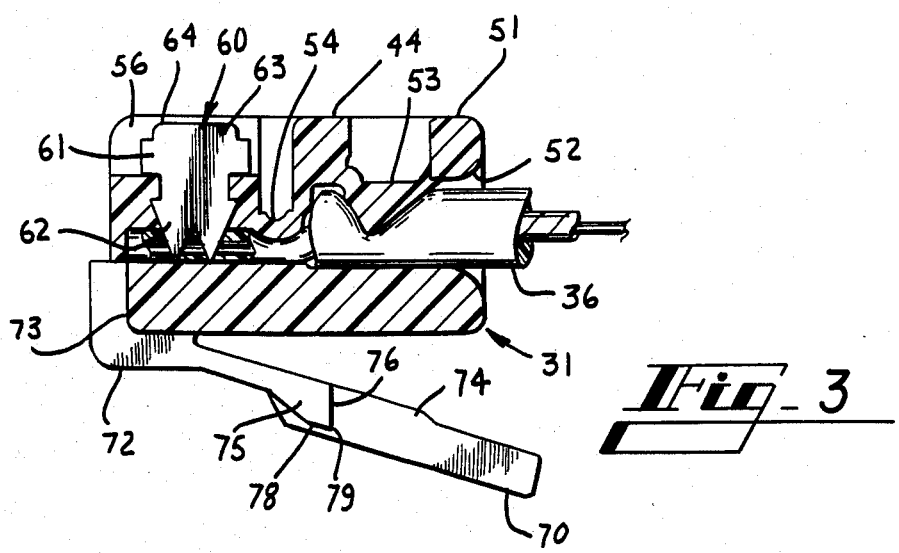
Fig_3

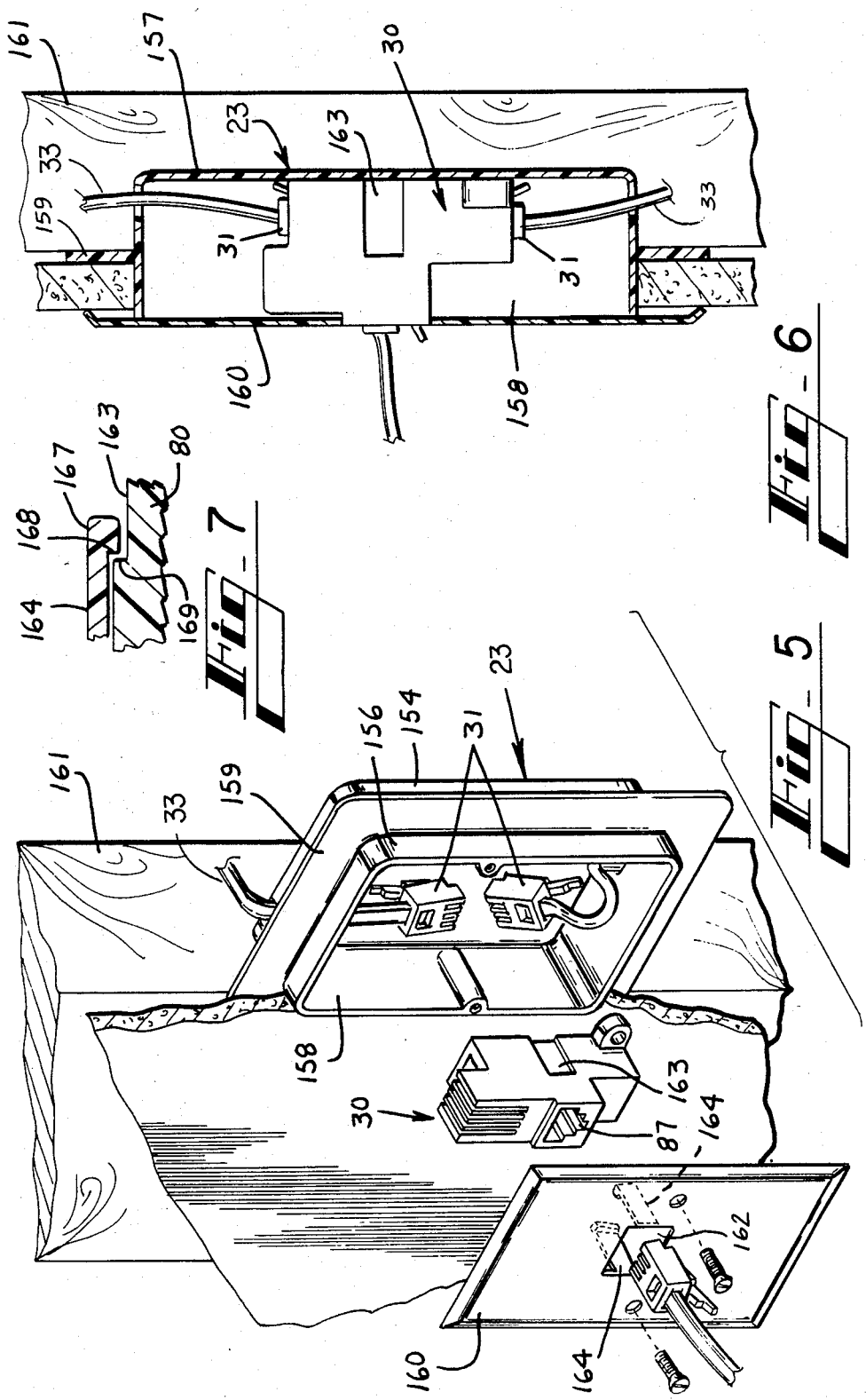

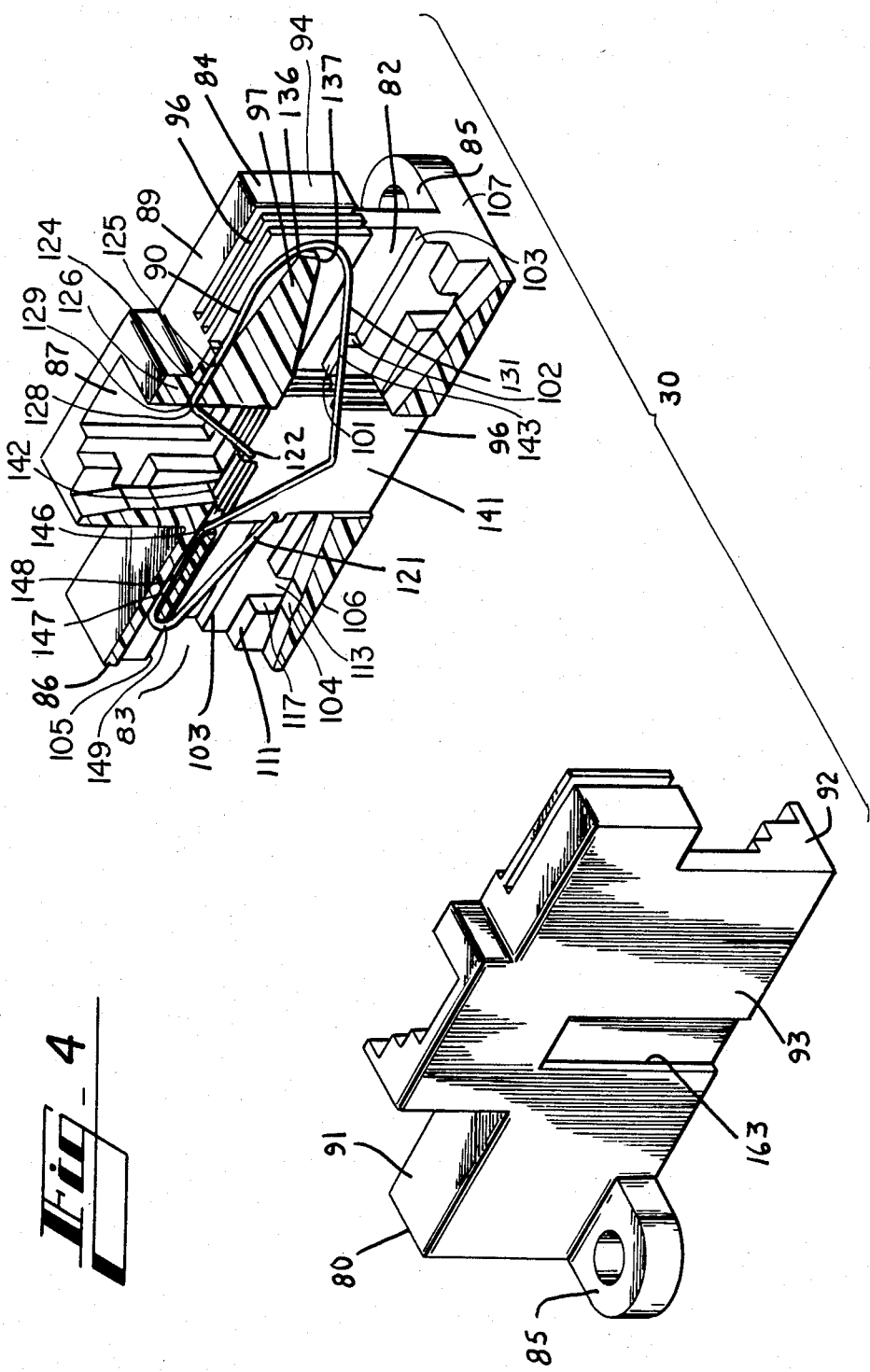

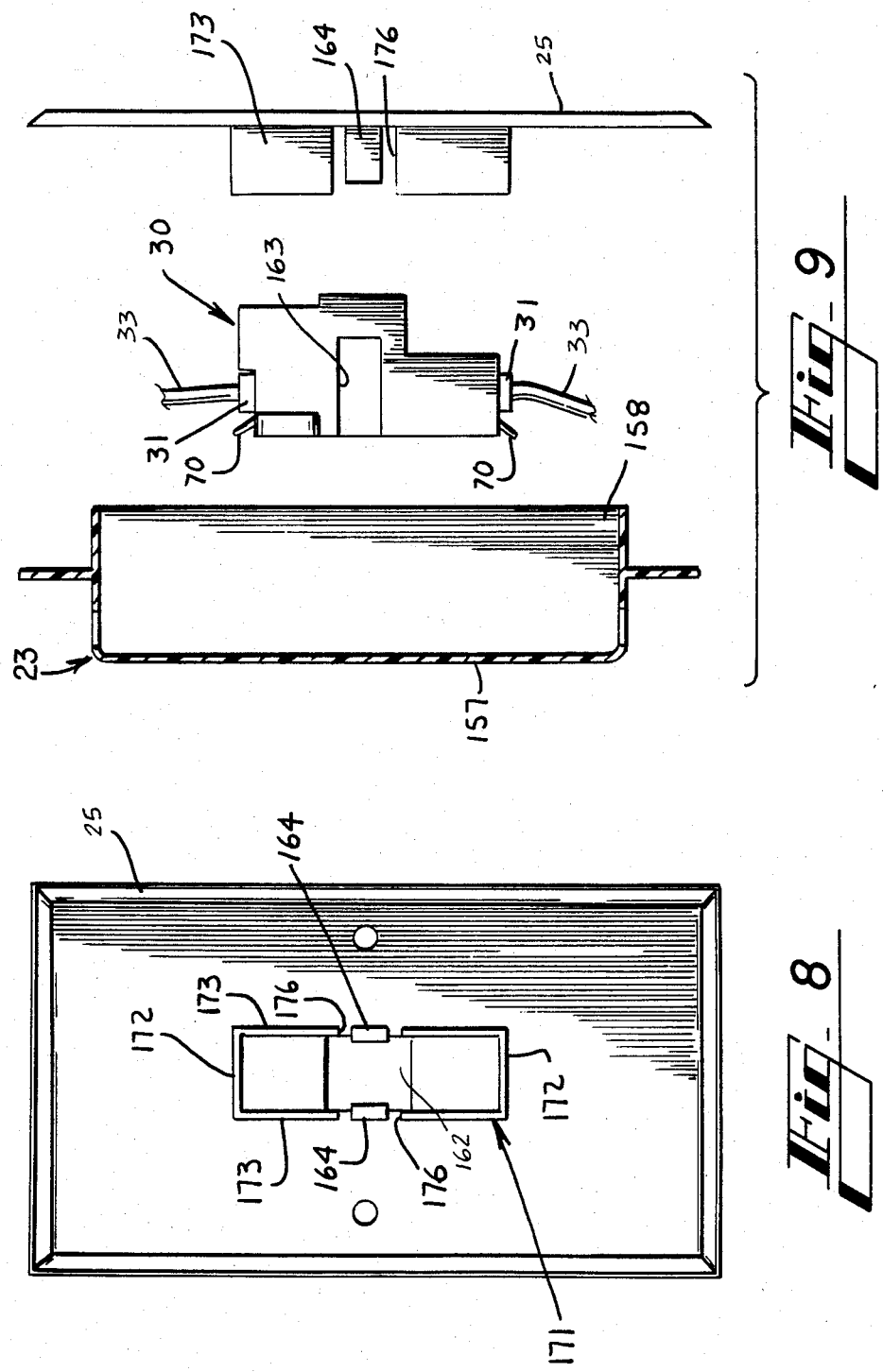

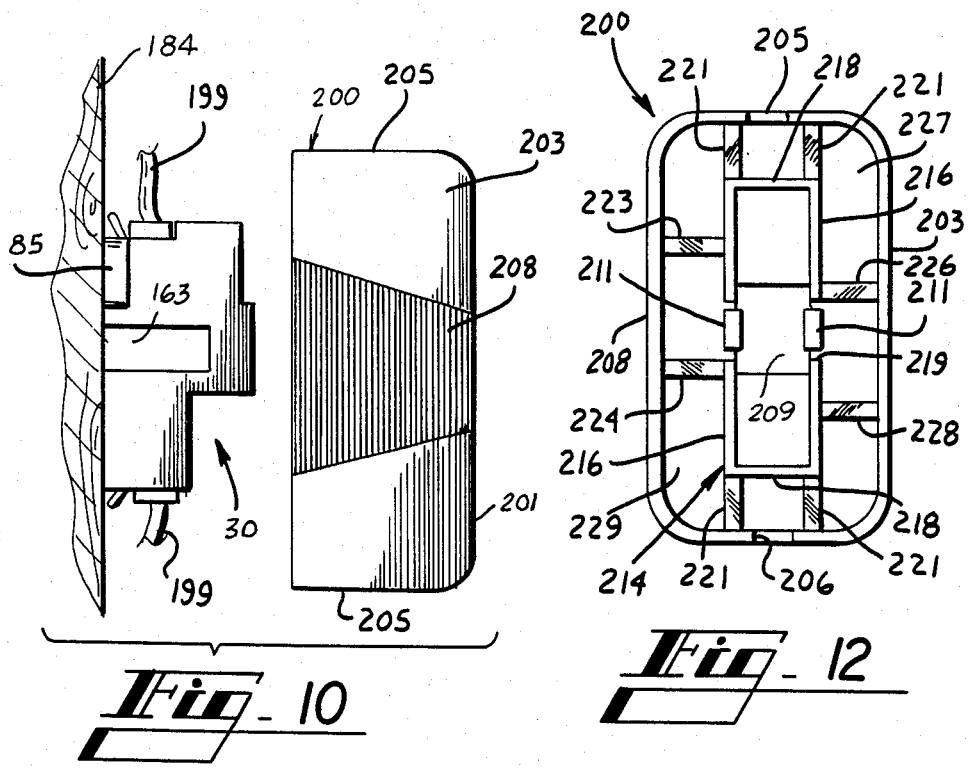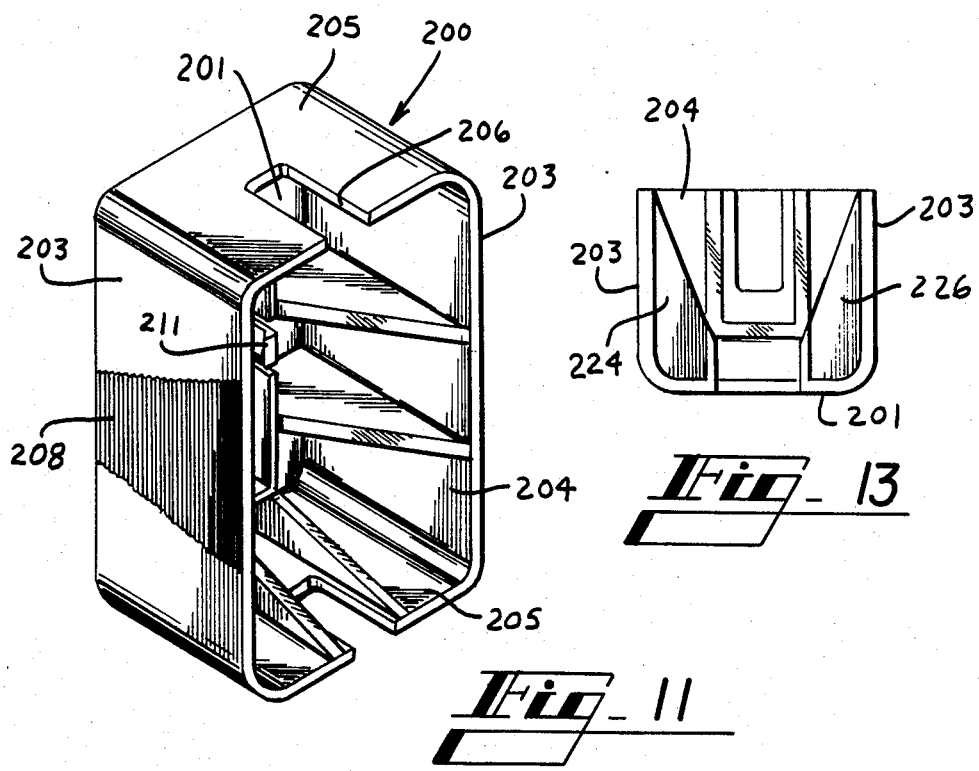

SELF-ALIGNING COVER FOR MODULAR TRICOUPLER

TECHNICAL FIELD

This invention relates to a a self-aligning cover for a modular tricoupler and, more particularly, to a modular tricoupler which is used for inside wiring such as telephone service cables, for example, and which is adapted to be secured to a self-aligning cover.

BACKGROUND OF THE INVENTION

Modularity is used widely in telephone communication systems. In a modular system, a modular plug which terminates an end of a telephone cord is inserted into a cavity of a modular jack which is mounted in a wall outlet or in portions of customer station equipment. Typically, a home is equipped with any number of wall outlets each of which includes a modular jack. This allows the customer to move a telephone from room to room and allows the customer to purchase and to install new telephones and new cords as desired.

A typical telephone wiring system includes a network interface device, a plurality of wire junction devices and wall outlets distributed about the rooms of a home, for example. Inside wiring which includes a relatively small number of insulated conductors enclosed in a plastic jacket is run from any entry junction device which is fed from the interface to a plurality of wall outlets. A line is also run friom the entry wire junction device to another junction device to which additional wall outlets are connected. Typically, the plastic jacket must be removed from each end of a length of inside wiring to permit connection of the conductors to the junction devices and wall outlets. There has been a desire to improve the just-described system to simplify the wiring and to provide multiple circuit paths to each wall outlet to decrease the probability of service outage.

For many years, installation service was provided by a telephone operating company to each customer premises as requested initially with wiring runs to additional rooms as requested subsequently. Each additional outlet required a visitation by a craftsperson of the telephone operating company. With the advent of modularity, it no longer became necessary for a craftsperson to visit customer premises to connect a telephone into the network. However, this was only true if modular outlet devices had been provided in or on the walls. This led to programs intended to pre-wire customer premises for telephone usage with modular outlet devices positioned in preselected locations during the construction of the premises. Other developments in telephone communications have led to the probable situation where inside wiring may be installed by craftspeople other than telephone operating company personnel.

These developments have led to the desire for more simplistic devices for use in modular wiring systems. Goals include the use of lengths of inside wiring which have been terminated with modular plugs. The plugs which terminate the wiring may be secured to the wiring in a factory environment or in the field. The lengths are connected end to end with the use of a coupler such as that disclosed and claimed in U.S. Pat. No. 4,268,109 which issued on May 19, 1981 in the name of E. C. Hardesty. An end of each run of wiring should be easily connectable to the sought-after wall outlet device to which a plug of customer station equipment is also connectable. Such a device includes a tricoupler, which is disclosed in copending commonly assigned application Ser. No. 442,931 which was filed on even date herewith in the name of E. C. Hardesty.

The tricoupler disclosed in the above-identified application may be secured to a cover. The cover is provided with latching tabs which cooperate with grooves in sides of a housing of the tricoupler to secure the housing to the cover. Then the cover is secured to a receptacle which causes the tricoupler to be disposed in the receptacle. If the customer or craftsperson making the installation is not careful when securing the cover to the receptacle, one of the latching tabs could be inserted inadvertently into an outwardly facing jack cavity of the housing. This could result in damage to the relatively fragile wire-like contact elements disposed within the jack cavity. The same problem may occur should the tricoupler be secured to a baseboard molding and the cover secured to the tricoupler.

SUMMARY OF THE INVENTION

The foregoing problem has been overcome by the modular tricoupler and cover of this invention. The tricoupler comprises a housing which is made of a dielectric material and which includes first, second and third modular plug-receiving cavities spaced about the housing. A wire-like contact element is mounted in the housing. When modular plugs are inserted into the cavities, blade-like terminals of the plugs engage end portions and/or an intermediate portion of the contact element to establish electrical contact therewith. Typically, the tricoupler includes a plurality of contact elements corresponding in number to the terminals within a modular plug to be received in one of the cavities. Two of the cavities generally are opposed to each other and receive plugs which terminate service wiring that is run inside walls of a customer's home or along a baseboard molding. The third cavity is adapted to receive a modular plug that is connected to customer station equipment.

A cover is adapted to be secured to the tricoupler such that the third cavity of the tricoupler is exposed to receive a modular plug that terminates a cord that is connected to the customer station equipment. The cover includes facilities for causing an opening therethrough to become aligned with the tricoupler customer cavity during the assembly process. Camming wedges may be provided to cam the cover into alignment with the tricoupler.

A wall outlet of this invention includes a receptacle which generally is made of a plastic material and which is securable within a wall. An open side of the receptacle faces outwardly into a room wherein there is located customer equipment to be connected to a network. A plastic cover is attachable to the receptacle and includes a pair of latching tabs for snaplocking into grooves in the side of the tricoupler housing for securing a modular tricoupler to the cover. One cavity of the tricoupler communicates through an opening in the cover to the room to receive a modular plug of the equipment. The other two cavities in the tricoupler are adapted to receive plugs of inside wiring that connect the customer equipment to the network. The cover includes an alignment fence which circumscribes the tricoupler housing as the tricoupler is secured to the cover and which prevents the latching tabs from entering the one cavity of the tricoupler.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view to show a cover of this invention, to which is to be secured a tricoupler, and a receptacle to which the cover is to be mounted;

FIG. 2 is a perspective view of a telephone station apparatus connected to a tricoupler for connection into a network;

FIG. 3 is an elevational view in section of a modular plug that is received in the tricoupler;

FIG. 4 is a perspective view of the tricoupler of FIG. 1 with portions thereof broken away to show a contact element disposed therein;

FIG. 5 is a perspective view of the tricoupler adapted to be secured to a cover that is mounted to a wall receptacle;

FIG. 6 is an elevational view of the cover, tricoupler and receptacle of FIG. 5;

FIG. 7 is a detailed view of a latch arrangement for holding a cover to the tricoupler;

FIGS. 8 and 9 are plan and elevational views of a preferred embodiment of a cover which is used with the in-wall installation of FIG. 1 and which includes an alignment device which cooperates with the latch arrangement of FIG. 7;

FIG. 10 is a plan view of the tricoupler mounted on a baseboard molding and of another embodiment of a cover of this invention;

FIG. 11 is a perspective view of a preferred embodiment of the cover of FIG. 10 for use with the baseboard mounted tricoupler;

FIG. 12 is a view of the cover of FIG. 11 taken from its underside; and

FIG. 13 is an end sectional view of the cover of FIG. 11.

DETAILED DESCRIPTION

Referring now to FIG. 1, there is shown a wall outlet, which is designated generally by the numeral 20 and which provides to a customer access to a telecommunications network. The wall outlet 20 includes a receptacle 23, a cover 25 of this invention and a tricoupler 30, which is described and claimed in priorly identified E. C. Hardesty application Ser. No. 442,931 filed on even date herewith. The wall outlet 20 allows a customer to insert a modular plug 31 of a cord 32 (see FIG. 2) that extends to station equipment into a customer cavity of the tricoupler and to interconnect inside wiring 33.

A telephone set 34 (see FIG. 2) to be interconnected to the wall outlet 20 through the cord 32 includes a base and a handset that are interconnected by a retractile cord 35. The ends of the cord 35 are terminated with modular plugs 31—31 which are received in jacks 36—36 in the base and in the handset. The modular plug 31 may be that shown, for example, in U.S. Pat. No. 4,148,539 which issued on Apr. 10, 1979 in the name of E. C. Hardesty while the jack 36 may be that shown for example, in U.S. Pat. No. 3,990,764 which issued Nov. 9, 1976 in the name of C. L. Krumreich, both of which patents are incorporated by reference hereinto.

The wall outlet 20 is used to facilitate inside communications wiring, particularly residential. Because of the modular tricoupler 30, the wiring of a home, for example, is done more simply than before. Lengths of inside service wiring are terminated at each end with a modular plug 31 which is insertable into a tricoupler 30 to interconnect the customer station equipment to the network. The modular tricoupler 30 is adapted to interconnect the modular plugs 31—31 which are used to terminate the small pair size inside wiring in the walls or along the baseboard molding and the line cord 32 from the customer station equipment.

Going now to FIG. 3, there is shown in detail the construction of the modular plug 31 which is used to terminate the cords and the inside wiring. The plug 31 includes a body 51 having an aperture 52 for receiving an end portion of a cord or of a length of inside wiring. The plug 31 is also constructed with strain relief portions 53 and 54 for securing the jacket and the individual conductors of the telephone cord within the body 51. Each of a plurality of terminal-receiving slots 56—56 in the plug body 51 is adapted to receive a blade-like terminal 60. Each terminal is made from an electrically conductive resilient material and has insulation-piercing tangs 62—62 protruding therefrom to provide an electrical connection between the conductive portion of a conductor and the terminal. An edge surface 63 having curved crowns 64—64 completes the connection between the associated conductor of the cord and an associated contact element within the modular tricoupler 30.

Formed integrally with the modular plug body 51 is a resilient locking tab 70 (see again FIG. 3) which extends angularly from the plug body. The tab 70 is connected by a plastic hinge to a nose 72 of the plug body 51. A free end of the tab 70 extends beyond the cord-input end of the plug body 51 when the tab is in its non-depressed position. The nose 72 has a width which is less than that of the plug body 51 and is spaced from the side surfaces of the plug body 51 by stepped recesses having faces 73—73. A portion 74 is stepped to form shoulders 75—75 having vertical latching surfaces 76—76 that are joined to flats 78—78 along edges 79—79.

As can be seen in FIG. 4, the modular tricoupler 30 includes a housing 80 having generally opposed first and second plug-receiving cavities 82 and 83 at end portions 84 and 86, respectively and a third cavity 87. The housing 80 is made from a dielectric material such as, for example, polycarbonate, rigid polyvinyl chloride (PVC), acrylonitrile butadiene styrene (ABS), a composition including ABS and PVC, DELRIN ® acetal plastic, or polyamide nylon plastic. The housing 80 is also provided with laterally extending lugs 85—85 which are used for mounting the tricoupler in engagement with supporting surfaces.

The tricoupler 30 also includes a plurality of metallic contact elements 90—90. The contact elements 90—90 may be made from a resilient metallic material such as, for example, Phosphor bronze alloy. The contact elements 90—90 make electrical connections with terminals 60—60 of modular plugs 31—31 that have been inserted into the cavities 82, 83 and 87 of the housing 80. Consequently, the contact elements 90—90 function to connect electrically the modular plug of customer station eqiupment to inside wiring or to interconnect inside wiring in series through a wall outlet or both.

In a preferred embodiment, the housing 80 of the tricoupler 30 is unipartite and includes a cover 91 and a base 92, and sidewalls 93 and 94. A plurality of partitions 96—96 extend from a surface 89 internally through the housing 80. The partitions 96—96 are maintained spaced apart by a plurality of separators 97—97 which are interposed between the partitions. The partitions 96—96 and the separators 97—97 provide compartments for receiving the contact elements 90—90 to maintain them spaced apart and to provide suitable dielectric protection therebetween.

As can be seen in FIG. 4, the molded cavities 82, 83 and 87 of the modular tricoupler 30 are generally identical and each include facilities for locking in a modular plug 31. The sidewalls of the housing which define each cavity are formed to include an abutment 101 having a vertical face 102. The vertical face 102 intersects a first ledge 103 which extends to the open end of the cavity. A second ledge 104 which is closer to an outwardly facing surface of the housing, such as the surface 106, then the ledge 103 extends from the partitions 96—96 to a surface 107 to which the cavity opens. A ceiling 105 is spaced from the ledges 103—103 a distance which is substantially equal to the distance between the surfaces that defines the height of the plug body 51.

In order to allow the tab 70 of the modular plug 31 to assume a normal position after insertion into a cavity of the tricoupler 30, each wall of the housing 80 which defines each cavity is formed to include a third ledge 111. Each ledge 111 is interrupted by an opening 113 having a rectangular cross-section and extending from an exterior surface. Those side ledge surfaces along which the shoulders 75—75 ride are interrupted so that at full insertion of the plug 31, portions of the shoulders clear those ledges allowing the arched tab 70 to resume its original orientation because of its resilience.

This structural arrangement of surfaces defining each cavity 82, 83 and 87 facilitates the receipt and the holding of a modular plug 31 and its facile withdrawal by a customer, if desired. When a modular plug 31 is inserted into one of the cavities, the tab 70 thereof is depressed and bent and has an arched configuration as the flats 78—78 of the shoulders 75—75 engage and ride along the ledge portions 111—111. At the same time, the underside of the plug body 51 is moved slidably along the ledges 103—103. The inward movement of the plug body 51 is discontinued when the faces 73—73 of the recesses engage the surface 102 that extends between the abutment 101 and the ledges 103—103. As the shoulders 75—75 of the plug tab 70 pass vertically oriented surfaces 117—117 of the openings 113—113, the resilient tab 70 returns to its normal undeflected position causing the shoulders to become disposed in the interrupted portions of the sidewalls along the ledges 111. The arrangement resists withdrawal of the plug 31 from the tricoupler 30 because of the engagement of the vertical surfaces 76—76 of the tab 70 with the vertical surfaces 117—117 which define the openings 113—113.

The ease with which plugs 31—31 may be inserted into and removed from the modular tricoupler 30 facilitates residential and commercial wiring and interconnection of customer station equipment to the network. The free end of the tab 70 of the plug 31 extends beyond end surfaces of the plug to permit its digital depression by a customer so that it reassumes the arched configuration of entry. The cavity 83 is formed so that with the plug body 51 in proximate engagement with the ceiling 105 and the ledges 103—103, the depression of the tab 70 moves the shoulders 75—75 a distance so that the flats 78—78 are disposed substantially at the level of the ledges 111—111 to permit withdrawal of the plug.

Each of the wire-like contact elements 90—90 includes end portions 121 and 122 (again see FIG. 4). The retroflexed end portion 121 is received in the cavity 83 of the two generally opposed cavities, and the other end portion 122, in the third cavity 87. The end portions 121 and 122 are disposed in the plug-receiving cavities in a manner such that they are adapted to engage portions of the blade-like terminals 60—60 of modular plugs 31—31 that are inserted into those cavities. Each contact element 90 includes a portion 124 which extends through a passageway 125 between an upper portion 126 and one of the plurality of separators 97—97. Each passageway 125 is designed so that a radiused portion 128 of the contact element associated therewith avoids engagement with an adjacent corner 129 of the housing 80.

Each contact element 90 includes a hoop 131 which shifts when a portion of it is engaged by a terminal 60. By allowing the loop 131 to flex in a relatively short distance between cavities, a permanent set of the wire-like contact element 90 is avoided. The loop 131 of each contact element 90 make a turn about one of the separators 97—97 position between two partitions 96—96 or between a partition and wall of the housing 80. As it makes its turn, it engages and is supported by a corner portion 136 of the separator which spaces apart the partitions 96—96 that form the compartment in which it is positioned. As can be observed from the drawings, an opposite corner 137 of the separator 97 is not engaged by the contact element 90 in its turn.

Following on from the vicinity of the corner 137, the loop 131 extends toward the center of the tricoupler 30. Each contact element 90 is unsupported as it dips downwardly into a chamber 141 disposed below a portion 142 of the jack cavity 87. From there, each contact element 90 extends angularly upwardly past, but spaced from, the associated portion 142. Adjacent to the portion 142, the contact element 90 turns at a corner 146 and includes a portion 147 that extends through a passageway 148. At the end of the horizontal portion 147, the contact element 90 includes a radiused portion 149 that connects with the retroflexed end portion 121.

When a modular plug is inserted into the cavity 82, each terminal blade 60 engages a contact element 90 along a portion 143 of the loop 131. As the plug 31 is moved to its fully inserted position, the loop 131 is shifted to a position where it is spaced from the corner 136 and an opposite corner 137 of the associated separator 97. If that modular plug 31 is withdrawn from the cavity 82, the loop 131 of the contact element 90 has sufficient resiliency so that it shifts and returns to its original position. Also, the loop 131 is moved without any significant resulting movement in the end portions 121 and 122 which would adversely affect the electrical contact pressure between the contact element 90 and the terminals 60—60 of inserted plugs 31—31.

In FIG. 1, there is shown the wall outlet 20 for providing in-wall telephone service between inside wiring 33—33 terminated with modular plugs 31—31 and customer station equipment. As will be recalled, wall outlet 20 includes the receptacle 23 which houses a tricoupler 30. The tricoupler 30 is capable of being received in any number of in-wall receptacles. As an example, the receptacle 23 includes a portion 154 having sidewalls 156—156, a base 157, and an open side 158. A flange 159 extends outwardly from the sidewalls 156—156 and is used to mount the receptacle 23 to a supporting member 161 within a wall of a customer's premises.

The tricoupler 30 is adapted to be secured to the cover 25 which is mounted to the receptacle 23 such that the third cavity 87 faces outwardly and is exposed through an opening 162 in the cover. Both the receptacle 23 and the cover 25 preferably are made from a rigid dielectric material which is easily molded. This arrangement differs from the conventional wall outlet in which inside wiring is connected to a connecting device inside the receptacle with a jack in the cover plate being connected by wires to the device inside the receptacle.

Initially, the cover for the wall outlet 20 appeared as is shown in FIG. 5. That cover, which is designated by the numeral 160, was also adapted to have the tricoupler 30 secured thereto and in turn to be secured to the receptacle 23 (see FIG. 6). As seen, the tricoupler 30 is formed with a groove 163 on each of two opposing sides of the housing 80. These grooves 163—163 are adapted to receive latching tabs 164—164 which depend from the cover 160 that is adapted to enclose the receptacle 23 in much the same way that a cover plate covers the well-known electrical outlet for home or business use.

Going now to FIG. 7, it can be seen that each of the latching tabs 164—164 includes an end portion 167 having a latch 168 which is adapted to engage an end wall or keeper 169 of the groove 163 in the side of the tricoupler 30. The length of the grooves 163—163 from the base 92 toward the cavity 87 is such that when the cover 25 is positioned over the housing 80, the latches 168—168 are adapted to engage the keepers 169—169. The latch 168 and the end wall 169 are configured to provide a generally right angle corner along the surfaces which engage each other. The keeper 169 of each groove of the tricoupler housing 80 is always at right angles to adjoining surfaces of the housing as is shown in FIG. 7. By this arrangement, the cover is adapted to be secured to the tricoupler 30 to the extent that the cover must be removed from the receptacle 23 and substantial forces applied to remove the cover from the tricoupler. This prevents inadvertent dislocation of the tricoupler 30 from the cover when a customer inserts a plug 31 into the cavity 87. As can be seen by referring to FIG. 1, the above-described latching arrangement is also included in the cover 25.

As can be imagined from a perusal of the cover 160 of FIG. 5, a customer or a craftsperson might not successfully align the latching tabs 164—164 of the cover 160 with the grooves 163—163 at first try. Should a latching tab 164 be inserted inadvertently into the cavity 87, it could deform and undesirably reposition one or more of the end portions 122—122 of the contact elements 90—90.

In order to overcome this problem, the cover 160 of FIG. 5 is modified to include alignment facilities which are incorporated into the cover 25 of FIG. 1. The preferred embodiment of the cover 25 includes alignment means such as an alignment fence 171 (see FIGS. 1, 8 and 9) to assure that the latching tabs 164—164 are received in the grooves 163—163 of the housing 80. This also insures that the opening 162 in the cover 25 becomes aligned with the cavity 87 of the tricoupler. The alignment fence 171 includes two end portions 172—172 and two side portions 173—173 which cooperate to form a perimetral wall depending from the cover 25. Openings 176—176 are provided in the side portions 173—173 to provide for the latching tabs 164—164. The end portions 172—172 and the side portions 173—173 are spaced so that when the cover 25 is mounted to the tricoupler 30, the end portions and side portions engage the ends 84 and 86 and the side walls 93 and 94 of the housing 80 of the tricoupler.

It should be appreciated that the portions of the alignment fence 171 extend farther from the cover 25 than do the latching tabs 163—163 (see FIG. 9). In this way, the alignment fence encloses the tricoupler housing 80 prior to the engagement of the latching tabs with the keepers 169—169.

Reference to FIG. 1 is helpful in order to appreciate the technique for the assembly of the wall outlet. It will be observed that the inside wiring 33—33 terminated with modular plugs 31—31 extends into the receptacle 23 which is secured to a supporting member 161. A modular tricoupler 30 is secured to a cover plate 25 by causing the latching tabs 164—164 to be received in the grooves 163—163 of the tricoupler housing 80. The alignment fence 171 insures that neither tab 164 is inserted into the cavity 87. Then the cover plate 25 with the tricoupler 30 secured thereto is mounted to the receptable 23 by turning fasteners (not shown) through holes 178—178 in the cover plate into sockets 179—179 in the receptacle. The sockets 179—179 in the receptacle 23 are molded therein in a manner to avoid any conflict with the lugs 85—85 formed on the housing 80. Should it be desired to disengage the cover 25 from the tricoupler 30, the customer need only remove the cover from the receptacle 23 to provide access to the latching tabs 164—164.

In FIG. 10, the tricoupler 30, having opposed cavities 82 and 83 and a front entry cavity 87 for receiving a modular plug 31 that is connected to a line cord 32 extending to customer station equipment, is mounted on a baseboard 184. As shown, the tricoupler 30 is adapted to be secured to the baseboard 184 by the lugs 85—85 and to be enclosed with a cover 200. Also, the tricoupler 30 includes the side grooves 163—163 for receiving latching tabs which depend from the cover 200. The cover 200 has appropriate openings at each end and along a front to facilitate entry of plugs 31—31 that are connected to service cables 199—199 and a cord 32 connected to customer station equipment. However, as can be imagined, a customer or an installer inadvertently could cause a latching tab to enter the cavity 87.

A preferred embodiment of a cover 200 for the tricoupler 30 of FIG. 10 which is attached to an external surface of a wall is shown in FIGS. 11—13. The cover 200 includes a top 201, two sides 203—203 an open side 204 and two ends 205—205. Each of the ends 205—205 is formed with a slotted opening 206 through which a service wire 199 (see FIG. 10) extends to a modular plug 31 that is received in one of the opposed end cavities of the tricoupler. Portions of the sides 203—203 are formed with striations 208—208 to provide gripping surfaces for a user who wishes to install or to remove the cover 200. The top 201 includes an opening 209 which provides customer access to the tricoupler cavity 87.

As can best be seen in FIGS. 11 and 12, the cover 200 also includes a pair of latching tabs 211—211 which project from the top 201 toward the open side 204. The latching tabs 211—211 are adapted to snap-lock into the grooves 163—163 (see FIG. 10) on the sides of the tricoupler 30 when the cover is positioned over the tricoupler. Unlike the arrangement which is shown in FIG. 1, the latching tabs 211—211 of the cover 200 of the baseboard-mounted tricoupler 30 are modified to avoid a right angle surface for the latches 168—168. Rather, each latch 168 is sloped somewhat (see FIG. 11) to reduce the force that must be applied to remove the cover from the housing 80. Substantial forces are not required to remove the cover from the housing 80 of the baseboard mounted tricoupler 30 inasmuch as there is little danger of dislodging the tricoupler from the cover because the tricoupler is secured to the baseboard 184.

Advantageously, the cover 200 includes guide provisions for insuring that the latching tabs 211—211 are received in the grooves 163—163 on the sides of the tricoupler 30 and not inadvertently moved into the cavity 87 of the front facing jack cavity. These provisions include an alignment fence 214 (see FIG. 12) comprising two side portiions 216—216 and two end portions 218—218. Each of the side portions 216—216 is interrupted by an opening 219 to accommodate a latching tab 211.

The guide provisions also include a plurality of camming wedges spaced about the alignment fence 214 and extending between the alignment fence and the sides and ends of the cover 200. Two wedges 221—221 are formed at each end of the alignment fence, two wedges 223 and 224 on one side and two, 226, 228 on the other side of the fence. Each of the wedges slopes from an exterior wall of the cover 200 to the alignment fence (see FIGS. 11 and 13). Should the fence 214 not be aligned with the tricoupler 30 as the cover 200 is positioned over the tricoupler, the wedges engage portions of the tricoupler and cam the cover into its aligned position. This action may be enhanced by continuing the slope of the camming wedges across the sides and ends of the alignment fence 214, as is shown in FIG. 13.

As was mentioned, the camming wedges slope toward the alignment fence thereby decreasing the distance between opposing wedges. This arrangement is effective to provide a converging guide to funnel the cover over the tricoupler 30 and cause it to become centered over the tricoupler.

It should be observed from FIG. 12 that the side wedges 223,224 are offset from the side wedges 226,228. This is done in order to avoid engagement of the wedges with the mounting lugs 85—85 of the housing 80. Viewing now FIGS. 11 and 12, it should be appreciated that as the cover 200 is positioned over the tricoupler 30, one lug 85 is received in a portion 227 of the cover defined between an end wedge 221 and the wedge 226. The other lug 85 is received in a space 229 between an end wedge 221 and the side wedge 224.

It is to be understood that the above-described arrangements are simply illustrative of the invention. Other arrangements may be devised by those skilled in the art which will embody the principles of the invention and fall within the spirit and scope thereof.

What is claimed is:

1. A device for modular wiring systems, said device comprising:
   a tricoupler which includes:
   a housing which is made of a dielectric material, said housing including first, second and third modular plug-receiving cavities and a groove in each of two opposite sides thereof; and
   a wire-like contact element which is made of a relatively resilient metallic material and which is mounted in said housing, said wire-like contact element including one end portion which extends into said second cavity, another end portion which extends into said third cavity, and a loop which extends from the vicinity of said third cavity, through said first cavity toward said second cavity, and which is controlled to deflect sufficiently without permanent deformation to develop suitable contact pressure when engaged by a terminal of a modular plug that is inserted into said first cavity; and
   a cover which includes means for securing said tricoupler thereto, an opening which is aligned with said third cavity when said tricoupler is secured to said cover, and a pair of latching tabs depending therefrom with each said tab adapted to be received in one of said grooves of said housing, said cover also including alignment means for causing said opening to be aligned with said third cavity as said tricoupler is being secured to said cover, said alignment means including a perimetral fence which depends from said cover and which includes two end portions and two side portions with each side portion including two segments spaced from each other with one of said latching tabs disposed therebetween.

2. The device of claim 1, wherein said alignment means further includes a plurality of camming wedges which are spaced about the periphery of said perimetral fence and which slope from an external edge portion of said cover to said perimetral fence, said wedges being effective to engage said tricoupler housing and cam said cover into position such that said latching tabs are aligned with said grooves of said housing.

3. The device of claim 2, wherein said segments of said fence extend a greater distance from said cover than do said latching tabs.

4. The device of claim 2, wherein a laterally extending lug is provided on each of two opposed sides of said housing for mounting said tricoupler to a supporting surface with said lugs being offset from each other, and wherein at least two camming wedges are provided on each side of said cover with said wedges on each side being positioned to avoid interference with said lugs as said tricoupler is being secured to said cover.

5. A device for providing an interconnection of at least one service cable and a modular plug that is connected to customer station equipment, said device comprising:
   a receptacle having a base, sides and an open face opposite to said base, said receptacle further including means for mounting said receptacle to a supporting member within a wall;
   a tricoupler which is adapted to be received in said receptacle and which comprises:
   a housing which is made of a dielectric material, said housing including first, second and third modular plug-receiving cavities and a groove formed in each of two opposing sides; and
   a plurality of wire-like contact elements which are made of a relatively resilient metallic material and which are mounted in said housing, each having one end portion which extends into said second cavity and another end portion which extends into said third cavity, each said wire-like contact element also having a loop which extends from the vicinity of said third cavity, through said first cavity toward said second cavity, and which is controlled to permit sufficient deflection of segments of said loop when said loop is engaged by a terminal of a modular plug that is inserted into said first cavity to develop suitable contact pressure with the terminal without permanent deformation of the segments; and
   a cover which is made from a plastic material, which is adapted to enclose said open face of and to be mounted to said receptacle and which includes a pair of latching tabs depending from said cover, said cover further including an opening which is aligned with said third cavity of said tricoupler when said tricoupler is secured to said cover, and alignment means for causing said opening to become aligned with said third cavity as said tricoupler is being secured to said cover, each said latching tab being formed with a latch and each said groove being formed with an end wall that cooperate to hold said tricoupler to said cover and which upon the application of a predetermined force are caused to separate to permit removal of said cover from said tricoupler, said alignment means of said cover assuring the receipt of said latching tabs in said grooves when said tricoupler is secured to said cover and including a perimetral fence depending from said cover, said fence including two end portions and two side portions, each side portion comprising two segments spaced from each other with one of said latching tabs disposed therebetween.

6. The device of claim 5, wherein said alignment means further includes a plurality of camming wedges which are spaced about the periphery of said perimetral fence and which slope from an external wall of said cover to said perimetral fence, said wedges being effective to engage said tricoupler housing and cam said cover into position such that said latching tabs are aligned with said grooves of said housing.

7. The device of claim 6, wherein a laterally extending lug is provided on each of two opposed sides of said housing for mounting said tricoupler to a supporting surface with said lugs being offset from each other, and wherein at least two camming wedges are provided on each side of said cover with said wedges on each side being positioned to avoid interference with said lugs as said tricoupler is being secured to said cover.

8. A cover which is adapted to be secured to a connector having a cavity for receiving a modular plug, said cover including latching means for securing the connector to said cover and an opening which includes access to the cavity in the connector when said cover is secured to the connector, said cover also including an alignment fence and a plurality of camming wedges which are spaced about the periphery of said alignment fence and slope from an outer portion of said cover to said fence and which are effective to engage a housing of the connector and cam said cover into position to cause said opening in said cover to become aligned with the cavity in the connector and to cause said latching means to become aligned with means of said housing which cooperate with said latching means to secure the connector to said cover.

9. The cover of claim 8, wherein said latching means includes latching tabs which depend from said cover, and the connector includes grooves for receiving said tabs, said wedges causing said latching tabs to become aligned with said grooves of the connector.

10. The cover of claim 9, wherein said alignment fence is adapted to enclose and engage side surfaces of said connector.

* * * * *